Nov. 29, 1960

A. DAGER 2,961,870

VISCOSIMETER

Filed Dec. 22, 1958

INVENTOR,
ALBERT DAGER:

BY

ATTORNEY

Nov. 29, 1960   A. DAGER   2,961,870
VISCOSIMETER
Filed Dec. 22, 1958   2 Sheets-Sheet 2
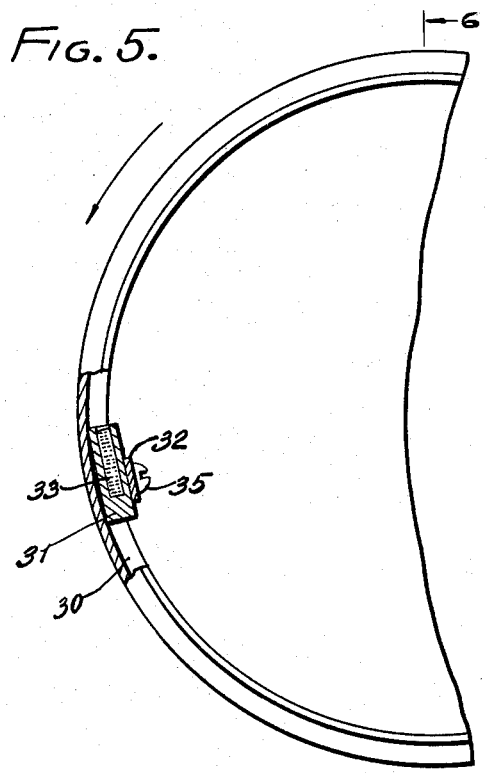
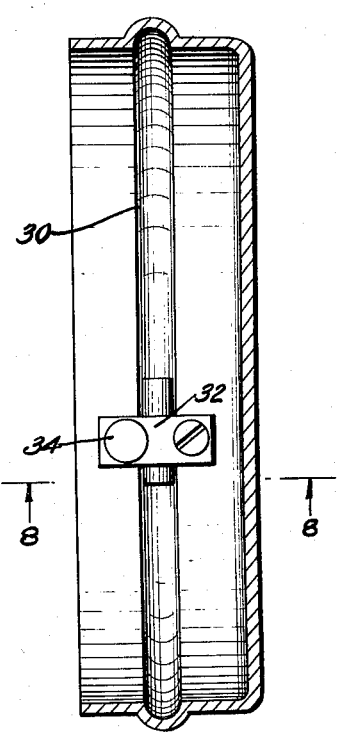
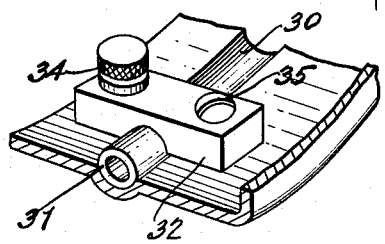
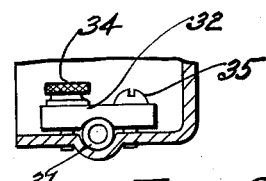
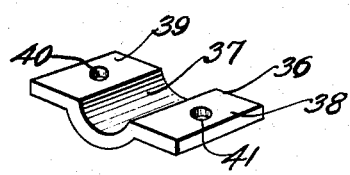
INVENTOR,
ALBERT DAGER;
BY
ATTORNEY

United States Patent Office 2,961,870
Patented Nov. 29, 1960

2,961,870

VISCOSIMETER

Albert Dager, 1030 W. 76th St., Los Angeles, Calif.

Filed Dec. 22, 1958, Ser. No. 782,013

3 Claims. (Cl. 73—54)

The present invention relates to a device for determining the viscosity of different substances. The determination of viscosity may be entirely arbitrary and to a selected scale. The scale may read in inches, degrees, etc., as may be desired by the operator of the device.

An object of the invention is to set a standard for various substances as to consistency or viscosity.

I propose by the preesnt invention to provide what I term a centrifugal viscosity gauge in that I provide a drum adapted to be rotated by suitable means relative to a stationary scale and whereby a given drop of material may be placed on the drum, and the drum rotated at a given speed for a definite duration of time and under determined temperature conditions. The drop of material, if a liquid, will spread and the amount of spread after the drum has stopped is determined by the scale reading, whether it be in inches or in degrees. Thus, by way of example, I may test a selected paint, oil, water mixed substance, pipe fitting compound, insulation material, and determine the amount of spread or elongation of the material relative to the scale. Thereafter upon duplication of the index material, the material may be tested by the device of this invention, and if the degree or length of spread thereof on the drum is the same, this is indication that the material has the same characteristics so far as viscosity or consistency is concerned, as the index material.

A machine of the character of this invention allows a speedy determination of the viscosity characteristics of the material without the necessity of making elaborate viscosity checks.

The particular apparatus of the invention is simple of structure, fool proof in operation, inexpensive in cost of manufacture, and will perform the function required with ease and dispatch.

In the drawing:

Figure 5 is a fragmentary, partially sectional view of the drum, slightly modified from that of Figures 2 and 3;

Figure 6 is a sectional view on the line 6—6 of Figure 5;

Figure 7 is a sectional perspective view and in fragment, of a specimen container and clamp for holding said container within a groove of the drum;

Figure 8 is a sectional view on the line 8—8 of Figure 6;

Figure 9 is a longitudinal sectional view of the container for specimen material; and Figure 10 is a perspective view of a slide which may be utilized in the groove of the drum for carrying out certain principles of the invention.

Figure 1:
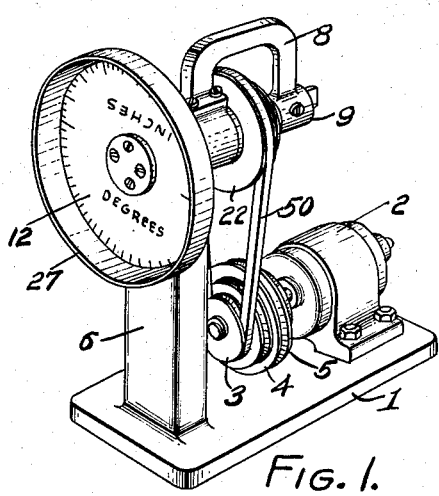
Figure 1 is a perspective view of one form of apparatus for carrying out the invention.

Referring now to the drawings, and specifically to Figures 1 to 4 inclusive, I provide a simple form of device which comprises a base or foundation member 1 upon which is mounted a motor 2, the motor shaft carrying a plurality of different diameter pulleys 3, 4 and 5. There may be any number of pulleys or a single variable diameter pulley may be incorporated. A post 6 is mounted on the base and provided at its upper end with a bearing block 7 to which bearing block is secured in any suitable manner, a U-shaped bracket 8 which terminates in a block structure 9. A stationary shaft 10 extends between the blocks 7 and 9 and beyond the bearing block 7, being held against movement by means of a pair of set screws 11 passed through block 9 for engagement with flattened sides of the shaft (see Figure 4). The stationary shaft 10 supports a dial 12 of disk form, upon the outer surface of which are printed or etched scales which may be of any character desired, but in the present instance show inches for a semi-circumference as indicated at 13 and degrees for a semi-circumference as shown at 14. The scale disk may be conveniently secured to the shaft 10 by providing one end of said shaft with an annular flange 15 against which the disk is held by screws 16. This construction preserves the alignment of the disk and assures that the disk is normal to the axis of the stationary shaft. Carried in the bearing block 7 and surrounding the stationary shaft 10 is a bearing sleeve 17 which may be formed from any material desired, such as bronze, babbitt, or other suitable material. Sleeve shaft 18 is within the bearing sleeve 17 and which shaft is flanged at one end 19 for engagement with the base 20 of a drum. The flange 19 is held to the base in any suitable manner such as by the screws shown at 21, of which there may be a plurality. The sleeve shaft 18 extends beyond the bearing block and has mounted thereon between blocks 7 and 9 pulleys 22, 23 and 24 as by means of set screws 25 passed through a common hub. I provide a bearing sleeve 26 between the stationary shaft and the sleeve shaft 18 for rotating the drum. The drum includes the base 20 and an annular flange 27 carried by the base. As shown, the dial 12 is adjacent the inner surface of the base and the said drum revolves around the said disk. It will be noted that the flange is of considerable width in order that a specimen, such as shown at 28, may be placed on the inner surface thereof at a selected point.

Figure 3:
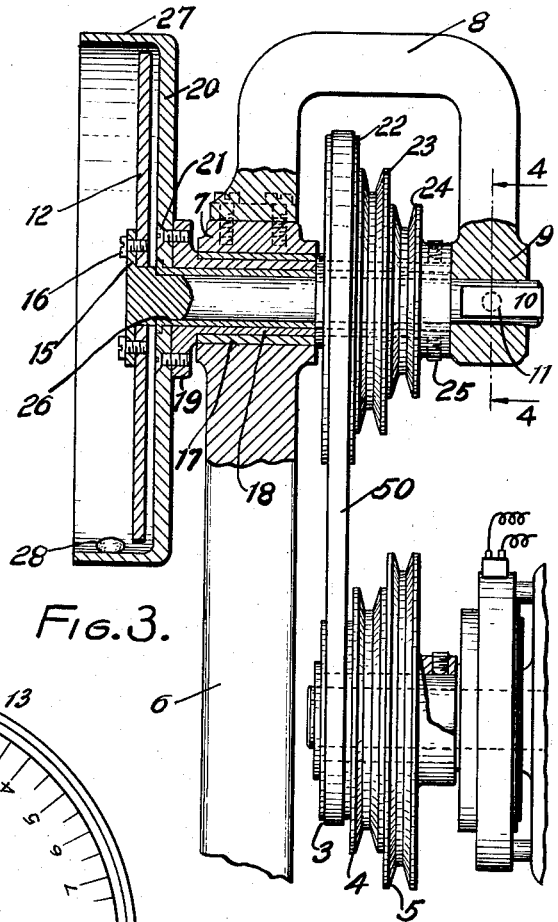
Figure 3 is a fragmentary, partially sectional view on the line 3—3 of Figure 2.

In the remaining Figures, 5 to 10 inclusive, I have shown modifications of the drum structure. For instance, in Figures 5 and 6, the drum flange is provided on its inner surface with an annular groove 30. Thus, instead of placing the material to be tested on the inner surface of the flange, as shown in Figure 3, the material is placed in the groove. As a further modification, a container of the type shown in Figure 9, and designated as 31, may hold the specimen to be tested, and this container is secured within the groove 30 by means of a clamp 32. The container itself has lesser diameter than the diameter of the groove and the container is provided with an axial bore 33 which terminates inward from one end of the container so as to form a well for the test specimen. The clamp is mounted transversely of the container and is secured to the flange of the drum by means of screws 34 and 35.

Figure 10 is a perspective view of a slide 36 having a concavo-convex portion 37 between two wings 38 and 39, the wings being drilled at 40 and 41 whereby the concavo-convex portion may be secured within the annular groove 30 of the flange of the drum.

Figure 2:
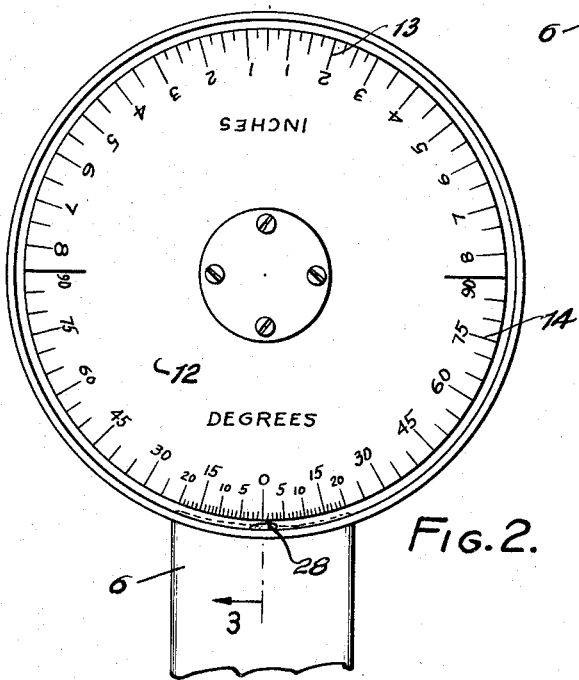
Figure 2 is a fragmentary, enlarged view of elements of Figure 1, showing a portion of the post, scale and drum which is adapted to rotate around the scale.
Figure 4:
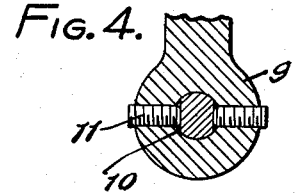
Figure 4 is a sectional view on line 4—4 of Figure 3.

The operation, uses and advantages of the invention just described are as follows:

I assume that a certain material having flow characteristics has been determined to be satisfactory for a given purpose in industry. This may be a paint, an oil, a water mixed substance, pipe fitting compound, liquids, plastic materials, etc. A drop of this preferred and previously determined to be satisfactory index material is placed upon the inner surface of the flange of the drum, as shown in Figure 2. It will be noted that this drop, indicated at 28, bisects the graduation marked 0. I then rotate the drum at some selected speed, say 1,000 r.p.m. for a given duration of time, say 15 seconds. I also note, prior to revolving the drum, the room temperature or any other selected temperature, if the particular device of the invention is operated under controlled temperature conditions. Therefore, I set a standard for this material as to an arbitrary viscosity or consistency, as well as determining torque, r.p.m., duration of r.p.m., and temperature. When the drum has stopped rotation, I then measure the length of spread of the specimen of material 28 on the drum flange relative to the degrees to the left as well as to the right of the scale reading and index marked 0, and the scale readings are then catalogued in a suitable manner for this material. If desired, the set screws 11 may be loosened from engagement with the fixed shaft whereupon the scale disk may be revolved so that inch readings may be obtained in place of degree readings for determining spread of the material upon rotation of the drum. Rotative speed of the drum is controlled by varying the drive between different pulleys through the medium of the continuous belt 50, and in the ordinary manner. Any other specimen of material to be compared with the selected index material would, of course, receive the same sequence of operation so far as torque, r.p.m., duration of r.p.m., and temperature is concerned. It is deemed that the test material would be the same as the selected material if the spread under the conditions set forth would read the same on the scale, assuming, of course, that the ingredients or the specimen material are substantially the same as the original material.

Under certain conditions, I may desire to use the specimen container of Figure 9, the bore or well 33 of which holds the specimen material and which container is secured by the clamp 32 within the annular groove 30 of the drum flange. Quite obviously when the drum is rotated in the direction of the arrow of Figure 5, the material will be centrifugally thrown from the container well and will spread within the groove and not escape therefrom, which in certain instances, depending upon the gravity of the material under test, is desirable. The reading relative to the scale disk, of course, remains the same as do all other variable conditions which have been previously selected.

The well 33 should be filled quite carefully, such as by a dropper, or a wire, to eliminate air in the well head.

In the case of the open slide of Figure 10, this device is placed within the annular groove 30 and may be used to contain heavy substances.

It is not necessary to place the test material at any particular scale mark, such as when employing the container 31. Thus the drum may be rotated so that the container 31 has its well 33 in the position shown in Figure 5. The drum is then rotated and stopped and the degrees or inches of spread is noted by reading the dial marking, or if desired the drum may be turned slowly so that one end of the spread material is at zero indication, followed by observing the opposite end of the spread in relation to a dial marking.

It is felt that the function of the device will be understood by those having use for a device of this character from the description heretofore given.

I claim:

1. A device for measuring the viscosity of a test specimen of a flow material relative to a selected index flow material under like conditions of revolutions per minute, temperature, and time, including: a drum having a base and an annular flange; a dial bearing indicia within the drum, means fixedly holding the dial against rotation; and means secured to the drum base for rotating the drum on a horizontal axis, said annular flange adapted to have placed on the inner surface thereof a drop of test material, which, upon drum rotation, spreads on said flange, the degree of spread being determined by dial reading when rotation of the drum is stopped.

2. The device as set forth in claim 1, the drum flange provided with an annular, concavo-convex groove for receiving the drop of test material.

3. The device as set forth in claim 2, and a container for holding the test material, positioned within said groove.

References Cited in the file of this patent

UNITED STATES PATENTS 2,826,061    Forsten et al. _____ Mar. 11, 1958